(12) United States Patent
Palmer et al.

(10) Patent No.: US 9,082,078 B2
(45) Date of Patent: Jul. 14, 2015

(54) NEURAL PROCESSING ENGINE AND ARCHITECTURE USING THE SAME

(75) Inventors: Douglas A. Palmer, San Diego, CA (US); Michael Florea, Lake Forest, CA (US)

(73) Assignee: The Intellisis Corporation, San Diego, CA (US)

( * ) Notice: Subject to any disclaimer, the term of this patent is extended or adjusted under 35 U.S.C. 154(b) by 383 days.

(21) Appl. No.: 13/560,890

(22) Filed: Jul. 27, 2012

(65) Prior Publication Data
US 2014/0032457 A1    Jan. 30, 2014

(51) Int. Cl.
G06N 5/00 (2006.01)
G06F 1/00 (2006.01)
G06N 3/063 (2006.01)

(52) U.S. Cl.
CPC ........................................ *G06N 3/063* (2013.01)

(58) Field of Classification Search
None
See application file for complete search history.

(56) References Cited

U.S. PATENT DOCUMENTS

| | | | | |
|---|---|---|---|---|
| 4,974,169 | A | 11/1990 | Engel | 706/42 |
| 5,285,524 | A | 2/1994 | Cok | 706/31 |
| 5,325,464 | A | 6/1994 | Pechanek et al. | 706/41 |
| 6,085,233 | A | 7/2000 | Jeffrey et al. | 709/216 |
| 7,685,409 | B2 | 3/2010 | Du et al. | 712/228 |
| 8,126,828 | B2 | 2/2012 | Snook et al. | 706/27 |
| 8,655,815 | B2 | 2/2014 | Palmer et al. | 706/26 |
| 2002/0083297 | A1 | 6/2002 | Modelski et al. | 712/18 |
| 2004/0030745 | A1 | 2/2004 | Boucher et al. | 709/203 |
| 2005/0204058 | A1 | 9/2005 | Philbrick et al. | 709/238 |
| 2006/0010144 | A1 | 1/2006 | Lawrence et al. | 707/100 |
| 2007/0011118 | A1 | 1/2007 | Snook et al. | 706/16 |
| 2007/0022063 | A1 | 1/2007 | Lightowler | 706/15 |
| 2007/0121499 | A1 | 5/2007 | Pal et al. | 370/230 |
| 2008/0215514 | A1 | 9/2008 | Morgan | 706/20 |
| 2010/0095088 | A1 | 4/2010 | Vorbach | 712/29 |
| 2010/0161533 | A1 | 6/2010 | Snook et al. | 706/43 |
| 2010/0312735 | A1 | 12/2010 | Knoblauch | 706/25 |
| 2011/0083000 | A1 | 4/2011 | Rhoades et al. | 712/22 |
| 2011/0145179 | A1* | 6/2011 | Nugent | 706/21 |
| 2011/0161625 | A1 | 6/2011 | Pechanek | 712/11 |
| 2011/0219035 | A1 | 9/2011 | Korsunsky et al. | 707/784 |

(Continued)

FOREIGN PATENT DOCUMENTS

| | | |
|---|---|---|
| WO | WO9202866 | 2/1992 |
| WO | WO9320552 | 10/1993 |
| WO | WO 2014/062265 | 4/2014 |
| WO | WO 2014/089259 | 6/2014 |

OTHER PUBLICATIONS

Kim et aL, "Mapping of Neural Networks onto the Memory-Processor Integrated Architecture", *Neural Networks*, vol. 11, No. 6, Aug. 1998, pp. 1083-1098 (20 pages).

(Continued)

*Primary Examiner* — Jerry A. Gaffin
*Assistant Examiner* — Kalpana Bharadwaj
(74) *Attorney, Agent, or Firm* — Arnold & Porter LLP

(57) ABSTRACT

A neural processing engine may perform processing within a neural processing system and/or artificial neural network. The neural processing engine may be configured to effectively and efficiently perform the type of processing required in implementing a neural processing system and/or an artificial neural network. This configuration may facilitate such processing with neural processing engines having an enhanced computational density and/or processor density with respect to conventional processing units.

23 Claims, 5 Drawing Sheets

(56) References Cited

U.S. PATENT DOCUMENTS

| | | | |
|---|---|---|---|
| 2011/0289034 A1 | 11/2011 | Palmer et al. | 706/26 |
| 2011/0307079 A1* | 12/2011 | Oweiss et al. | 623/27 |
| 2011/0313961 A1 | 12/2011 | Toscano et al. | 706/14 |
| 2012/0240185 A1 | 9/2012 | Kapoor et al. | 726/1 |
| 2012/0320921 A1 | 12/2012 | Barnes et al. | 370/392 |
| 2014/0156907 A1 | 6/2014 | Palmer | 711/5 |
| 2014/0172763 A1 | 6/2014 | Palmer et al. | 706/33 |

OTHER PUBLICATIONS

Schaefer et aL, "Simulation of Spiking Neural Networks Architectures and Implementations", *Neurocomputing*, vol. 48, 2002, pp. 647-679 (33 pages).

Frank et al., "An Accelerator for Neural Networks with Pulse-Coded Model Neurons", *IEEE Transactions on Neural Networks*, vol. 10, No. 3, May 1999, pp. 527-538 (12 pages).

Rast et al., "Virtual Synaptic Interconnect Using an Asynchronous Network-On-Chip", *Proceedings of the 2008 IEEE International Joint Conference on Neural Networks*, Jun. 1, 2008, pp. 2727-2734 (8 pages).

Purnaprajna et aL, "Using Run-Time Reconfiguration for Energy Savings in Parallel Data Processing", *Proceedings of the International Conference on Engineering of Reconfigurable Systems and Algorithms*, Jul. 13, 2009, 7 pages.

Eichner et al., "Neural Simulations on Multi-Core Architectures", *Frontiers in Neuroinformatics*, vol. 3, Article. 21, Jul. 2009, p. 1-15.

Extended European Search Report and Opinion dated Nov. 6, 2013 for corresponding EP application 11783883.9, 7 pages.

* cited by examiner

NEURAL PROCESSING ENGINE AND ARCHITECTURE USING THE SAME

FIELD

The disclosure relates to a neural processing engine configured to perform processing within a neural processing system and/or an artificial neural network, as well as architectures that use neural processing engines.

BACKGROUND

Conventional processing units have become increasingly complex to enhance the computational sophistication of the individual processing units. Recently, attempts have been made to solve complex computational problems using (simulated) neural networks. However, such attempts typically have relied on the infrastructure of conventional processing units designed to perform conventional computer processing. As such, conventional neural computing may be restricted in efficiency, effectiveness, and/or cost by the mismatch between computing resources and computing philosophy.

SUMMARY

One aspect of the disclosure relates to a system and method of processing accomplished by a neural processing engine. The mathematical function implemented by the neural processing engine may be referred to as an artificial neuron. The neural processing engine may be configured to effectively and efficiently perform the type of processing required in implementing a neural processing system and/or an artificial neural network. This configuration may facilitate such processing with neural processing engines having an enhanced computational density and/or processor density with respect to conventional processing units, which may be expressed as MIPS/mm$^2$, FLOPS/mm$^2$, number of processors per mm$^2$, and/or other units. The neural processing engine may be implemented to form the computational analogy to a neuron, the neuron having a plurality of input values (provided by, e.g., the outputs of other neurons). The plurality of input values may be processed (e.g. by weighted sum) in a single step or epoch to produce one or more output values. Input values for a neural processing engine may be referred to as inputs. Output values may be referred to as outputs. A set of neural processing engines may form a group of neural processing engines, which may be referred to as a group, a set, and/or a combination interchangeably herein. One or more groups may be combined together in a design or architecture to form an artificial neural network. In some implementations, a neural processing engine may comprise one or more of non-transitive electronic storage, a register file, a logic unit, one or more hardware look-up tables, and/or other components.

The non-transitive electronic storage of a neural processing engine may be configured to store instruction code. The instruction code may correspond to one or more types of basic operations. The instruction code may be for execution by the neural processing engine. The non-transitive electronic storage may have a capacity of about 2 Kb or less, about 8 Kb or less, about 2 KB or less, about 8 KB or less, and/or other storage capacities.

The register file of a neural processing engine may be configured to electronically and non-transitively store information in one or more registers included within the register file. The register file may be configured such that the registers may be read and/or written by a dispatch unit that communicates with one or more neural processing engines, and/or the register file may be read and/or written by other constituent components of the neural processing engine. Communication between a dispatch unit and one or more neural processing engines may be based on the exchange and/or transfer of packets over one or more point-to-point connections. Packets contain information and/or sets of values, including operands, operator codes, destination addresses, and/or other information. The register file may include an incoming packet space for containing a set of input values or an incoming packet, an outgoing packet space for containing a set of output values or an outgoing packet, and/or other registers and/or spaces. A set of registers in a packet space may also be referred to as a subset of the register file or, simply, as a set of registers. The set of input values of an incoming packet may be contained in a set of registers within the register file. An incoming packet may be referred to as an input packet. The set of output values of an outgoing packet may be contained in a set of registers within the register file. An outgoing packet may be referred to as an output packet. Packets may represent connections between neural processing engines that are similar and/or (computationally) analogous to connections between neurons.

The incoming packet space may be fixed in the register file. The incoming packet space may be configured such that information and/or input values of incoming packets are loaded, written, and/or programmed by the dispatch unit into the registers of the incoming packet space. A given incoming packet may include information generated by one or more other neural processing engines. Alternatively, and/or simultaneously, an incoming packet may be stored in a non-transitive electronic packet storage that is accessible by the dispatch unit. The individual incoming packets may be associated with individual epochs, wherein an individual epoch corresponds to a set of processing steps a neural processing engine performs to produce and/or generate one or more output values (e.g. assembled in the form of an outgoing packet) based on the information and/or input values in an incoming packet. An epoch may take one or more clock cycles to complete. In other words, the duration in clock cycles of an epoch may be variable.

The outgoing packet space may separate from the incoming packet space. The outgoing packet space may be fixed in the register file. The outgoing packet space may be configured such that information and/or output values of outgoing packets are transferred to and/or read by the dispatch unit, e.g. from the registers of the outgoing packet space. Outgoing packets may contain one or more output values produced and/or generated by the neural processing engine based on an incoming packet. The registers of outgoing packets may be individually assembled in the outgoing packet space.

The logic unit of a neural processing engine may be configured to execute instruction code stored in the non-transitive electronic storage of a neural processing engine. Instruction code may correspond to one or more different operations. Information included in an incoming packet, such as operator codes, may be used to select one or more operations from the instruction code for execution. The logic unit may be configured to determine output values based on performing selected operations on input values, such as operands, included in the incoming packets. For example, responsive to a first packet being loaded into the incoming packet space, the first packet (i) being associated with a first epoch, and (ii) including a first input operand and a second input operand generated by one or more other neural processing engines during one or more previous epochs, the logic unit may execute particular instruction code to generate an output value for the first epoch based on performing the selected operation on the first input operand and a second input operand. The resulting output value may be written into an outgoing packet being assembled in the outgoing packet space.

The one or more hardware look-up tables may include a look-up table configured to facilitate determinations of one variable, referred to as a result, an output variable, or an output value, as a function of another variable, referred to as an input variable or an operand. The function implemented by the hardware look-up table may be a sigmoid function, arithmetic function, trigonometric function, reciprocal function, square root, and/or other functions. Execution of instruction code by the logic unit may include referencing and/or using a hardware look-up table. The one or more hardware look-up tables may be configured to be set up by directly loading, programming, and/or writing information from the register file, e.g. the incoming packet space, to a hardware look-up table.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
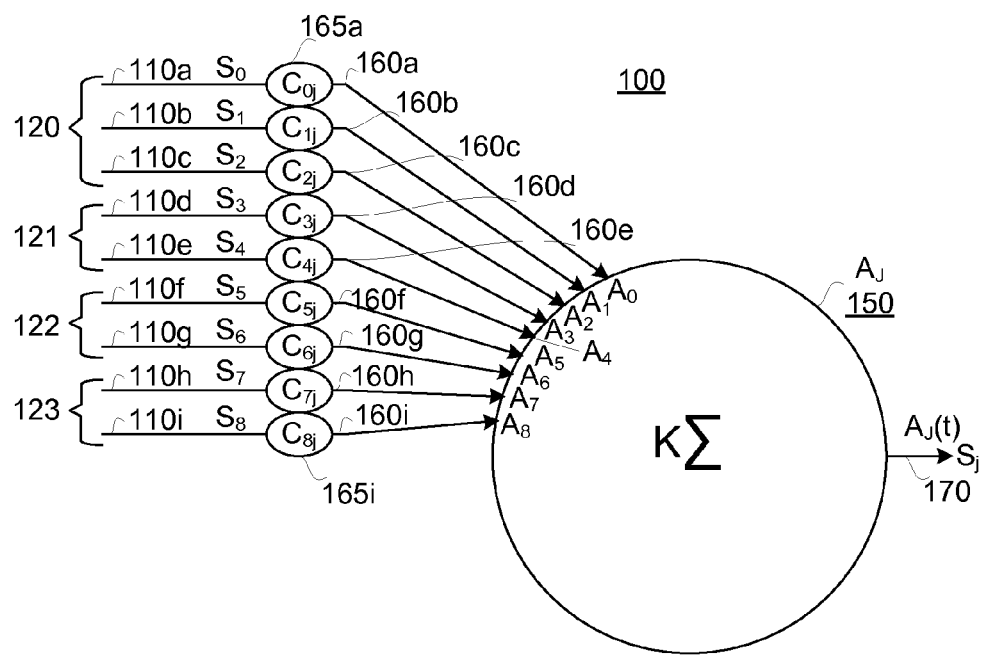
FIG. 1 illustrates a neuron within a neural system.

FIG. 1 depicts a system 100 including a neuron $A_j$ 150. Neuron $A_j$ may be implemented by a neural processing engine (also referred to as NPE). Although FIG. 1 depicts a single neuron 150, system 100 may include a plurality of neurons as well. The plurality of neurons may be implemented by a neural processing engine, or by a plurality of neural processing engines.

Neuron 150 may generate an output value Aj(t) 170 (also referred to as output 170) based on input values $A_i(t-1)$ (also referred to as activation values, which correspond to $A_0$-$A_8$) on respective connections 160a-i, weights $W_{ij}$ (which are labeled $C_{oj}$ or 165a through $C_{8j}$ or 165i), and input values 110a-i (also referred to as activation values, which are labeled $S_0$-$S_8$). The input values 110a-i may be received from the output values of other neurons, from memory, and/or from one or more sensors providing a value, such as for example a voltage value. The weights $W_{ij}$ 165a-i (also referred to as connection weights or connection values) may be received from memory and/or provided by a host computer.

To illustrate by way of a non-limiting example, at a given time epoch, t, individual ones of the input values 110a-i are multiplied by one of the corresponding weights 165a-i. For example, input value 110a may be multiplied by weight $C_{oj}$ (165a) to produce input value $A_0$ (160a), input value 110b may be multiplied by weight $C_{1j}$ (165b) to produce input value $A_1$ (160b), and so forth. The products (e.g., of the multiplications of the input values and weights) may for example be summed within neuron 150, and the resulting sum may further be operated on by a basis function K to yield at time t the output value $A_j(t)$ 170 for neuron $A_j$ 150. Output 170 may be used as an input value at a subsequent epoch time (e.g., at t+1). The output derived during the epoch t+1 may then become an input value at some other future epoch (e.g., at t+2 and/or some other future epoch).

System 100 may include a plurality of neurons, such as for example one or more neurons similar to neuron 150, and individual ones of the neurons may be implemented on the neural processing engines described herein. Moreover, the neurons may be configured in accordance with a neural model, an example of which is as follows:

$$A_j(t) = K\left[\sum_{i=0}^{N} A_i(t-1) * W_{ij}\right], \quad \text{Equation 1}$$

Wherein
K corresponds to a basis function (examples of which include a sigmoid, a wavelet, and any other basis function),
$A_j(t)$ corresponds to an output value provided by a given neuron (e.g., the $j^{th}$ neuron) at a given time/epoch t,
$A_i(t-1)$ corresponds to a prior input value (or activation value) assigned to the $i^{th}$ input of the $j^{th}$ neuron at a previous time/epoch t−1,
$W_{ij}$ (which may be referred to as $c_{ij}$) represents the $i^{th}$ weight for the $j^{th}$ neuron,
j varies in accordance with the quantity of neurons and identifies a given neuron,
i varies from 0 to n−1, and
n corresponds to the number of input connections to the neuron.

Although the description herein refers to Equation 1 as an example of a neural model, other models may be used as well to define the type of neuron. Moreover, in some implementations, individual connections may be associated with one of a plurality of neuron types. For example, input values 110a-c may be related to a first neural model corresponding to a first type 120 of neuron, input values 110d-e may be related to a second neural model corresponding to a second type 121 of neuron, input values 110f-g may be related to a third neural model corresponding to a third type 122 of neuron, and input values 110h-i may be related to a fourth neural model corresponding to a fourth type 123 of neuron. In particular, coupled differential equations may be easily solved by finite differences. The number of neuron types depicted in FIG. 1 is exemplary and not intended to be limiting in any way.

Figure 2:
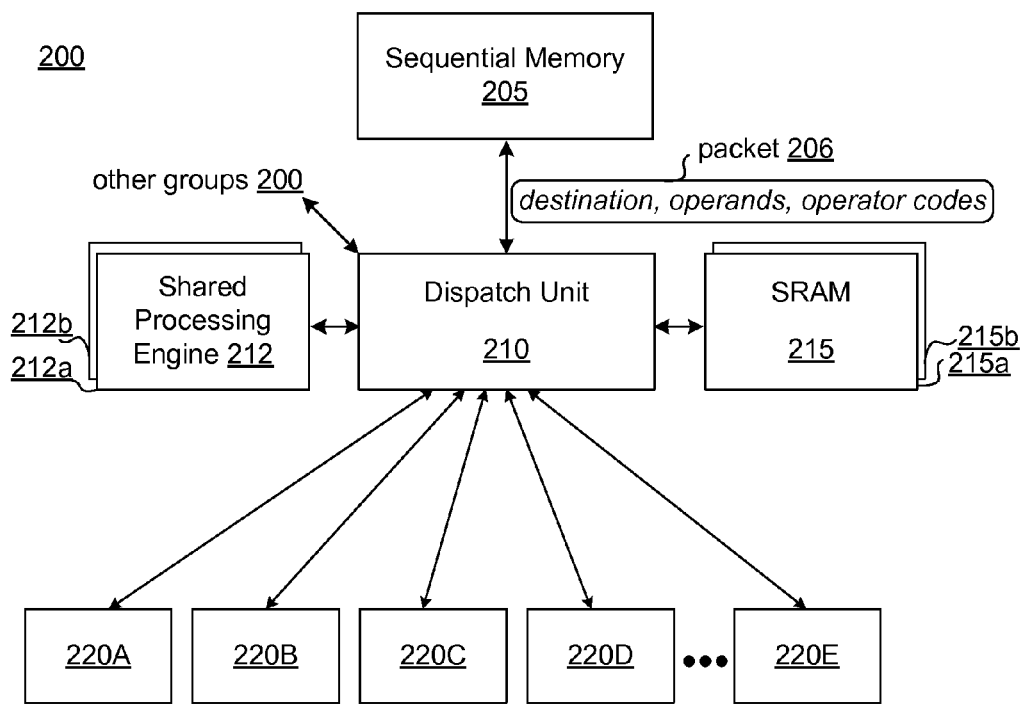
FIG. 2 illustrates a neural processing engine.

FIG. 2 depicts an example implementation of a system for neural processing 200, which may be referred to as group 200. Group 200 may be configured to operate as one or more neurons within a neural system. For example, group 200 may operate as neuron 150 described above with respect to FIG. 1, and/or other neurons. Group 200 may include one or more of a first memory, such as for example sequential memory 205, a dispatch unit 210, a second memory, such as for example static random access memory 215 (labeled SRAM), one or more neural processing engines, such as for example one or more neural processing engines 220A-E, one or more shared processing engines 212, one or more look-up tables (LUTs, not depicted in FIG. 2), and/or other components. In some implementations, group 200 may include a first SRAM 215a, a second SRAM 251b, and/or other static random access memories. In some implementations, group 200 may include a first shared processing engine 212a, a second shared processing engine 212b, and/or other shared processing engines. Group 200 may operate such that neural processing engines 220A-220E may be configured to perform individual operations, thereby implementing the types of processing that would be performed by neurons in a neural processing system. Neural processing engines 220A-220E may implement different types of neurons, such as (referring to FIG. 1) first type 120, second type 121, third type 122, fourth type 123, and/or other types of neuron.

Referring to FIG. 2, dispatch unit 210 may be configured to obtain a packet 206 from sequential memory 205. Packets may be retrieved from sequential memory 205 in a sequential manner. A set of packets may be referred to as a program. Packet 206 may include a destination, one or more operands, one or more operator codes, and/or other information. The destination, which may include one or more destination addresses or intended recipients, may identify one or more entities external to group 200. Alternatively, and/or simultaneously, the destination of individual packets may identify one or more neural processing engines 220A-E. Alternatively, and/or simultaneously, the destination of individual packets may identify static random access memory 215. Dispatch unit 215 processes packets in a manner similar to a very long instruction word (VLIW) processor, by decoding one or more operator codes included in a header of the packet and processing the packet (in a manner similar to a very long instruction word) as instructed through the one or more included operator codes.

In some implementations, dispatch unit 210 may have point-to-point connections to neural processing engines 220A-E, which may be used for the transfer of individual packets. Dispatch unit 210 may be configured to retrieve and/or access data, e.g. packets, from static random access memory 215. For example, dispatch unit 210 may process and/or combine such retrieved and/or accessed data with a packet from sequential memory 205 during transfer of the packet to one of the neural processing engines 220A-220E. In other words, a packet may be combined, altered and/or changed by dispatch unit 210 during transfer, e.g. as instructed through one or more operator codes in a header of the packet. Dispatch unit 210 may be configured to transfer packets (and/or data within packets) from one or more neural processing engines 220A-E to either static random access memory 215, one or more neural processing engines 220A-E, and/or other destinations.

Group 200 may be configured to communicate with other groups of neural processing engines, for example using point-to-point connections. The destination of individual packets within neural processing engine 220 may identify these other groups of neural processing engines. In some implementations, a plurality of groups of neural processing engines may be arranged such that individual ones of the groups have connections with four other groups. The directions of these connections may be referred to as "left", "right", "up", and "down".

As the neural system proceeds through successive epochs, the neural processing engines 220A-E may provide the functionality associated with different neurons during different epochs. For example, neural processing engine 220A may operate as a first neuron (or first neuron type) in the neural system at an epoch t, and may operate as a second neuron (or second neuron type) in the neural system at some future epoch t+n. The output values generated by the second neuron at the future epoch t+n may indirectly or directly be based on the output value of the first neuron at epoch t, an output value of a different neuron determined based on the output value of the first neuron at epoch t, output values from other neurons, and/or other input values.

In some implementations, group 200 may be the same as or similar to the neural processing engine(s) described in U.S. patent application Ser. No. 13/011,727, filed Jan. 21, 2011, and entitled "NEURAL PROCESSING UNIT", which is hereby incorporated by references in its entirety into the present disclosure.

Figure 3:
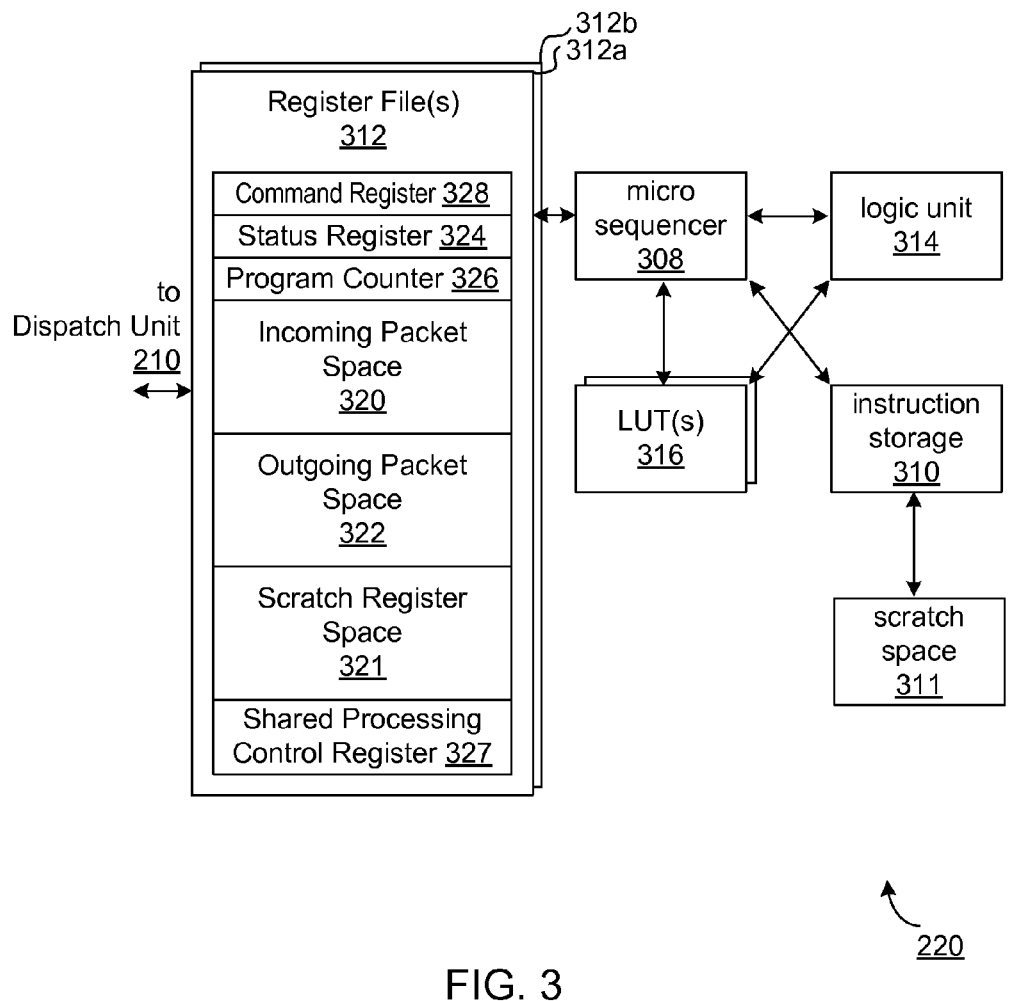
FIG. 3 illustrates a neural processing engine.

FIG. 3 schematically illustrates a neural processing engine 220. The depiction of neural processing engine 220 is exemplary and not intended to be limiting in any way. For example, lines and/or arrows connecting various components within FIG. 3 are exemplary and not intended to be limiting in any way. One or more of neural processing engines 220A-E in FIG. 2 may be implemented as neural processing engine 220 in FIG. 3. Neural processing engine 220 may include one or more of a micro sequencer 308, instruction storage 310, one or more register files 312, an arithmetic logic unit 314, one or more look-up tables 316, scratch space 311, and/or other components. The components of neural processing engine 220 (e.g., 308, 310, 311, 312, 314, and/or other components) may be implemented as one or more integrated circuits. Integrated circuits may be formed on a common substrate. In some implementations, the one or more integrated circuits forming neural processing engine 220 may be formed on a common substrate with one or more other neural processing engines, and/or components of group 200 shown in FIG. 2, such as for example, dispatch unit 210, static random access memory 215, and/or other components. The configuration of neural processing engine 220 may enable neural processing engine 220 to be formed with less than about 50,000 transistors, less than about 30,000 transistors, less than about 16,000 transistors, and/or with other numbers of transistors.

Referring to FIG. 3, instruction storage 310 may include non-transitive electronic storage configured to store instruction code by neural processing engine 220. This instruction code may include instructions implementing one or more operations, for example arithmetic operations. Instruction storage 310 may be configured as writable storage, e.g. writable during execution of programs from a sequential memory. Instruction storage 310 may be configured as static random access memory to facilitate access to different portions of the instructions, as needed. In some implementations, instruction storage 310 may hold about 2 Kb or less, about 8 Kb or less, about 2 KB or less, about 8 KB or less, and/or other storage capacities. Instruction storage 310 may be relatively small in comparison with conventional processing units because, among other things, the operations for which neural processing engine 220 may be implemented may be fairly basic and/or straightforward, and/or may not require many lines of (micro)code and/or (micro)instructions. Different instances of instruction storage 310 may implement different sets of operations. Different sets of operations may correspond to different neuron types. For example, some sets of operations may support floating-point operations, whereas other sets of operations support other operations. In some implementations, instruction storage 310 may have access to scratch space 311, which may function as (general-purpose) electronic storage available for usage by any component of neural processing engine 220. Alternatively, and/or simultaneously, micro-sequencer 308 may have access to scratch space 311 (not depicted in FIG. 3).

In implementations that include one or more shared processing engines 212, neural processing engine 220 may encounter one or more operator codes of one or more special instructions that are not implemented in instruction storage 310. These operator codes may be referred to as special operator codes. The one or more special instructions may be implemented in shared processing engine 212. One or more special output values, generated by executing the one or more special instructions, may be transferred from shared processing engine 212 to neural processing engine 220 and/or any of its constituent components. For example, the one or more special output values may be assembled by micro-sequencer 308 as described elsewhere herein. For example, first shared processing engine 212a may implement complex and/or rare operations such as floating-point divide. First shared processing engine 212a and second shared processing engine 212b may implement different operations.

Individual ones of the one or more register files 312 may be configured to electronically and non-transitively store information, e.g. in a set of registers. An individual register file 312 may include about 256 registers, about 512 registers, and/or another number of registers. Registers in an individual register file 312 may be relatively small, for example about 128 bits or smaller, about 256 bits or smaller, about 512 bits or smaller, and/or other sizes. An individual register file 312 may include a first packet space 320, a second packet space 322, and/or additional packet spaces and/or registers. Individual ones of the ones or more register files 312 may include general-purpose registers, scratch registers, context registers, and/or other registers.

Packet space 320 (also referred to as incoming packet space 320) may be configured to receive incoming packets for processing by neural processing engine 220. As such, dispatch unit 210 may be configured to transfer the incoming packets into incoming packet space 320. Incoming packet space 320 may be fixed in register file 312 such that incoming packets are written to the same block of memory in register file 312.

Packet space 322 (also referred to as outgoing packet space 322) may be configured such that packets that are outgoing from neural processing engine 220 may be individually assembled in outgoing packet space 332. As such, an outgoing packet may be assembled within register file 312 by neural processing engine 220. Since the outgoing packet is assembled directly in outgoing packet space 322, transfer of the outgoing packet may be executed by a single "send" command that causes the outgoing packet currently present in outgoing packet space 322 to be sent to dispatch unit 210. Outgoing packet space 322 may be separate and distinct from incoming packet space 320. Outgoing packet space 322 may be fixed within register file 312.

In some implementations, neural processing engine 220 may include a first register file 312a, a second register file 312b, and/or other registers or register files. In such implementations, packet space 320 of register file 312b may be programmed (i.e. loaded) by dispatch unit 210 (e.g. dispatch unit 210 transfers a packet into packet space 320 of register file 312b) during the same time period when another packet space 320 of register file 312a is being processed and/or operated on by neural processing engine 220. Then, responsive to completion of the processing associated with the current packet and register file 312a, packet space 320 of register file 312b may be accessed to commence processing and/or executing of the subsequent packet, and so on, back and forth between multiple register files. During processing and/or execution of the subsequent packet using register file 312b, dispatch unit 210 may transfer information such as output values from outgoing packet space 322 (e.g. an output packet) of register file 312a, and so on, back and forth between multiple register files. Alternating the functionality of packet transfer and packet processing between first register file 312a and second register file 312b, and vice versa, may be accomplished in a manner (e.g. a pipe-lined manner) that is transparent to dispatch unit 210. For example, both register files may not be separately addressed during regular neural processing. Dispatch unit 210 merely alternates between transferring input packets into register file 312 and transferring output packets from register file 312.

An individual register file 312 may further include a status register 324, a program counter 326, a command register 328, a shared processing control register 327, a scratch register space 321, general-purpose registers, context registers, and/or other registers and/or spaces. In some implementations, some or all of these registers and spaces may be shared between multiple register files of the same neural processing engine 200 and/or between neural processing engine 220 and dispatch unit 210.

Micro-sequencer 308 may be configured to route signals between the various components of neural processing engine 220. This may facilitate communication between instruction storage 310, register files 312, logic unit 314, look-up tables 316, and/or other components. Logic unit 314 may be referred to as arithmetic logic unit 314 or ALU 314. Look-up table 316 may be referred to as LUT 316. Micro-sequencer 308 may be configured to facilitate communication within neural processing engine 220. Communication between any component of neural processing engine 220 and an external resource may be accomplished via register files 312 (e.g., as described herein). Micro-sequencer 308 may be configured to determine one or more operations to be executed (e.g. executed using logic unit 314) based on one or more operator codes included in individual incoming packets.

Logic unit 314 may be configured to perform operations by executing the instruction code stored in instruction storage 310. The operations to be performed may be determined by micro-sequencer 308 based on operator codes in input packets. Execution of the determined operations may generate one or more output values. Output values may be assembled into an output packet, e.g. by micro-sequencer 308, and transferred to dispatch unit 210 and/or transferred by dispatch unit 210 to one or more destinations, e.g. within a group of neural processing engines. A given output packet may include similar information as packet 206, in particular a destination that identifies to where dispatch unit 210 should transfer the given output packet. Output values and/or output packets may be used as input for subsequent processing and/or operations. Although logic unit 314 is depicted in FIG. 3 as being an individual entity/unit, it will be appreciated this is not intended to be limiting. The scope of this disclosure includes implementations in which the functionality attributed herein to logic unit 314 is provided by a plurality of separate logic units operating in cooperation.

In some implementations, neural processing engine 220 includes one or more look-up tables 316, which may be hardware look-up tables. A given look-up table 316 may be configured to facilitate determination of an output value as a function of an input variable or value. The input variable may be provided as an operand included in an input packet and/or as an intermediary variable used in executing stored instruction code. For example, the function may be a sigmoid, an arithmetic function, a trigonometric function, a reciprocal function, a square root, a hyperbolic tangent, and/or other functions. Execution of instruction code by logic unit 314 may include referencing and/or using a hardware look-up table 316. Neural processing engine may be configured to facilitate individual ones of look-up tables 316 by transferring information from register file 320 (e.g., from a payload of an incoming packet) directly into an appropriate look-up table 316 (e.g., a look-up table 316 indicated in a header of the incoming packet).

In some implementations, one or more look-up tables 316 is not included in neural processing engine 220, but in group 200, such that the functionality of such a look-up table 316 may be shared between multiple neural processing engines.

Referring to FIG. 3, command register 328 of register file 312 may be configured to store information related to control of neural processing engine 220. Such information may include a mode of operation, one or more commands for other components within neural processing engine 220, and/or other information. The mode of operation may include one or more of a diagnostic mode, a test mode, a boot mode, a debug mode, a step mode, a program/load mode, a run mode, a reconfiguration mode, and/or other modes. In some implementations, the mode of operation may indicate how and/or when other registers and/or remaining information in a packet should be used. For example, a diagnostic mode may be used to perform a self-test of the logic within neural processing engine 220 to determine whether any faults and/or hardware errors have occurred during manufacture, use, and/or other periods of time or portions of the life cycle of neural processing engine 220 or a system that includes this particular neural processing engine 220. For example, a boot mode may be used to initialize the logic within neural processing engine 220 in preparation for neural processing, which may be activated using a run mode. Initialization may include programming instruction code in logic unit 314. For example, a program/load mode may be used, e.g. during run mode, to program or load one or more look-up tables 316. During run mode, incoming packets may be processed to determine a sequence of operations to be performed, and the operands for individual operations, by executing instruction code stored in instruction storage 310. Command register 328 may be implemented as a write-only register. During the processing of the current epoch, micro-sequencer 308 may be configured to assemble one or more output values, generated by logic unit 314 as an output packet in outgoing packet space 322.

Status register 324 of register file 312 may be configured to store information related to process state on neural processing engine 220. Such information may include one or more flags, and/or other information. The one or more flags may include one or more of a Zero flag, a Carry flag, an Overflow flag, a Sign flag, a Negative flag, a Parity flag, and/or other flags). In conventional processing units, copying a status register may facilitate execution of an interrupt. Neural processing engine 220 may be configured to operate without interrupts. As such, an ability to copy and/or store status register 324 may not be provided and/or implemented by neural processing engine 220. Alternatively, and/or simultaneously, status register 324 may be implemented as a read-only register.

Program counter 326 of register file 312 may be configured to track a current position of neural processing engine 220 in the instruction code stored in instruction storage 310. This may be accomplished by maintaining a count, where the current value of the count corresponds to the current position of neural processing engine 220 in the instruction code. Program counter 326 (and/or some other component) may be configured to automatically increment this count responsive to an instruction within the instruction code being completed by neural processing engine 220. At branches, jumps and subroutine calls, returns, and/or other operations, the count may be interrupted and/or changed by placing a new value in program counter 326.

In implementations that include one or more shared processing engines 212, an individual register file 312 may include a shared processing control register 327. Processing of special operator codes (in input packets) for special instructions that are not implemented within neural processing engine 220 may be controlled through shared processing control register 327 and/or other registers of the individual register file 312. For example, shared processing control register may be used to pass operands to an individual shared processing engine 212, and/or pass special output values generated by an individual shared processing engine 212 back to neural processing engine 220 and/or any of its constituent components.

Figure 4:
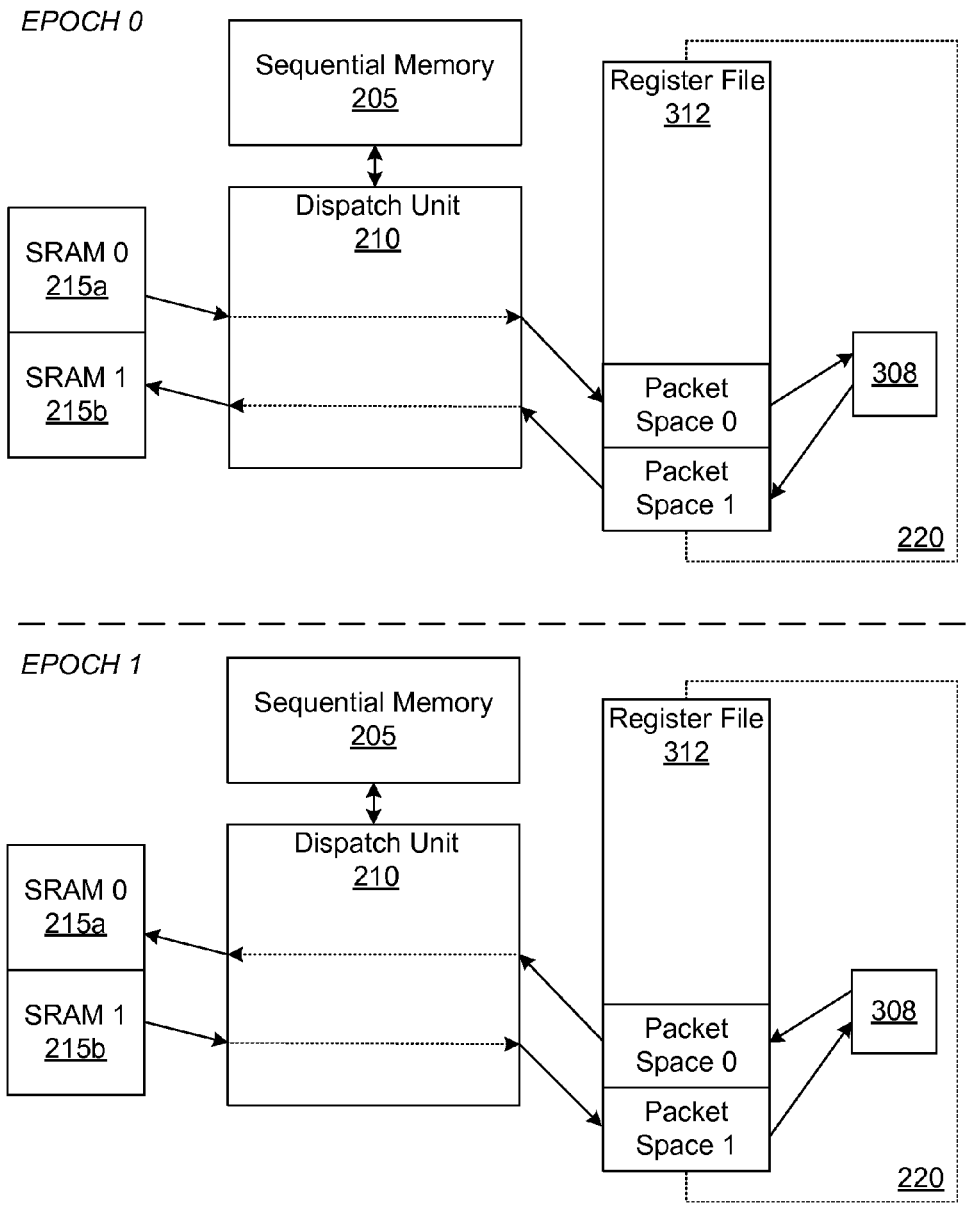
FIG. 4 schematically illustrates epochal processing.

By way of illustration, FIG. 4 schematically illustrates epochal processing as may be performed by of one or more embodiments disclosed herein. At epoch zero (labeled "EPOCH 0" in FIG. 4) a packet is transferred from sequential memory 205 to dispatch unit 210. Note that packets are transferred from sequential memory 205 in a sequential manner until the end of the current epoch. Dispatch unit 210 obtains data from static random access memory 215a (labeled "SRAM 0" in epoch 0 of FIG. 4). Dispatch unit 210 combined the obtained data and the transferred packet such that the combined packet is stored in the incoming packet space (labeled "Packet Space 0" in epoch 0 of FIG. 4) of register file 312. Micro-sequencer 308 and/or other constituent components (not shown in FIG. 4) of neural processing engine 220 operate on the incoming packet as described elsewhere herein to assemble an outgoing packet in the outgoing packet space (labeled "Packet Space 1" in epoch 0 of FIG. 4) of register file 312. The outgoing packet includes the output values generated by executing instructions included in the incoming packet. The outgoing packet is transferred to dispatch unit 210, and all or some of the outgoing packet is subsequently transferred and stored to static random access memory 215b (labeled "SRAM 1" in epoch 0 of FIG. 4). Note that data in static random access memory 215a does not collide with data in static random access memory 215b. Processing during epoch zero may be of arbitrary length. If an epoch includes multiple packets, subsequent packets may alternate (or "ping-pong") between using "Packet Space 0" as incoming packet space and "Packet Space 1" as incoming packet space, while at the same time alternating between using "Packet Space 1" as outgoing packet space and "Packet Space 0" as outgoing packet space, respectively. Note that subsequent packets in register file 312 do not collide. The same individual packet space is either used as incoming packet space or outgoing packet space during the processing of individual packets, but not both. Dispatch unit 210 may control epochal processing. If and when epoch zero is completed, epoch one (labeled "EPOCH 1" in FIG. 4) may commence.

In epoch one, a packet is transferred from sequential memory 205 to dispatch unit 210. Note that packets are transferred from sequential memory 205 in a sequential manner until the end of the current epoch, in this case epoch one. Dispatch unit 210 obtains data from static random access memory 215b (labeled "SRAM 1" in FIG. 4). Dispatch unit 210 combined the obtained data and the transferred packet such that the combined packet is stored in the incoming packet space (now "Packet Space 1" in epoch 1 of FIG. 4) of register file 312. It is assumed that, in the example depicted in FIG. 4, epoch zero contained an odd number of packets, for example one packet, such that the functionality of the packet spaces (i.e. incoming packet space versus outgoing packet space) within register file 312 is the opposite of the depiction of epoch 0 in FIG. 4. Note that this is exemplary only, and in no way intended to be limiting. In epoch 1, micro-sequencer 308 and/or other constituent components (not shown in FIG. 4) of neural processing engine 220 operate on the incoming packet as described elsewhere herein to assemble an outgoing packet in the outgoing packet space (now "Packet Space 0" in epoch 1 of FIG. 4) of register file 312. The outgoing packet includes the output values generated by executing instructions included in the incoming packet. The outgoing packet is transferred to dispatch unit 210, and all or some of the outgoing packet is subsequently transferred and stored to static random access memory 215a (labeled "SRAM 0" in FIG. 4). Note that data in static random access memory 215a does not collide with data in static random access memory 215b. Subsequent epochs may alternate (or "ping-pong") between using "SRAM 0" to obtain data and "SRAM 1" to store data, and vice versa. Processing during epoch one may be of arbitrary length.

Individual packets include a header and a payload. The header may identify a recipient for the packet, may identify the source of the packet (e.g., neural processing engine 220), may identify an epoch at which the payload was generated, and/or may include other information. The payload may include information generated, processed, determined, and/or obtained in other ways by neural processing engine 220. Such information may include, for example, an output value generated by neural processing engine 220, a confirmation that some action was taken, a request for information needed by neural processing engine 220 to complete a current and/or subsequent process, and/or other information.

Figure 5:
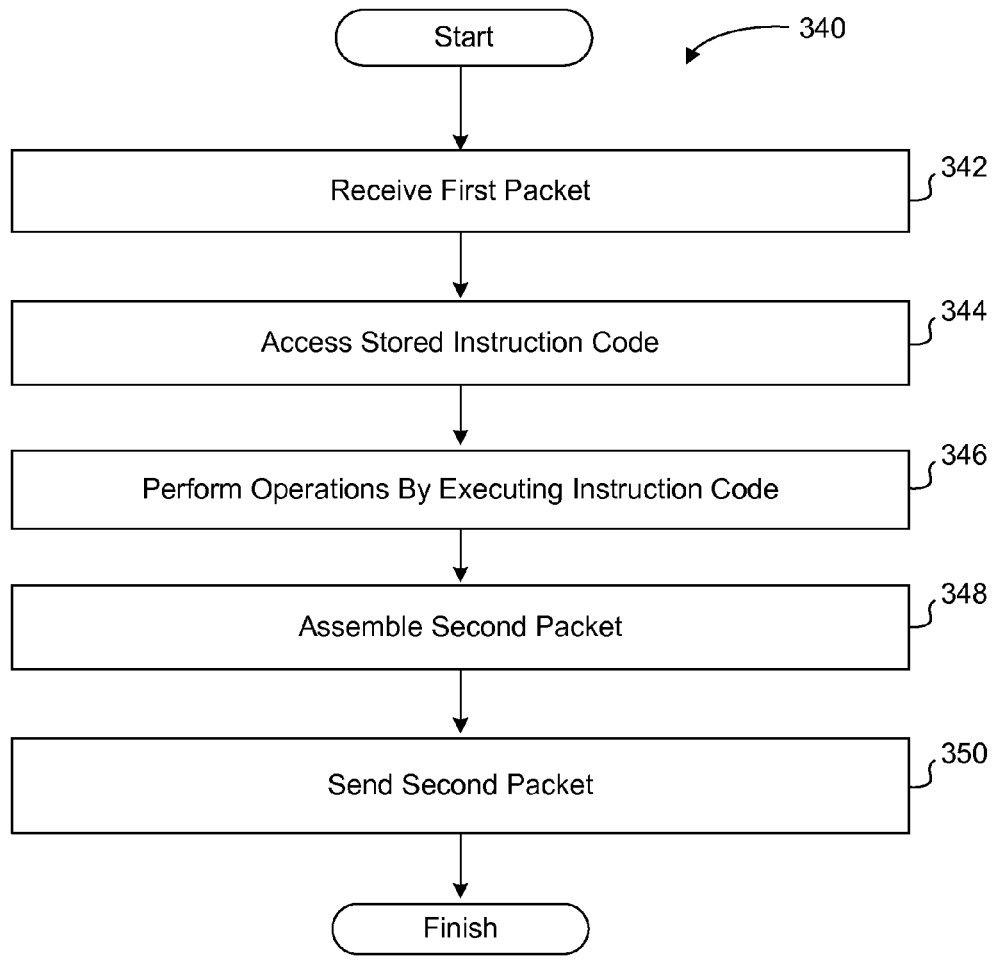
FIG. 5 illustrates a method of performing a neuron-level process.

FIG. 5 illustrates a method 340 of performing a neural processing. The operations of method 340 presented below are intended to be illustrative. In some implementations, method 340 may be accomplished with one or more additional operations not described, and/or without one or more of the operations discussed. Additionally, the order in which the operations of method 340 are illustrated in FIG. 5 and described below is not intended to be limiting.

In some embodiments, method 340 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 340 in response to instructions stored electronically on an electronic storage medium. The one or more processing devices may include one or more devices configured through hardware, firmware, and/or software to be specifically designed for execution of one or more of the operations of method 340.

At an operation 342, a first packet may be transferred into a register file of a neural processing engine. The first packet may be associated with a first epoch. The first packet may include a header and a payload. Alternatively, and/or simultaneously, the first packet may include one or more operands and one or more operator codes. The payload may include information related to a context for the first epoch. Such information may include a first input value or operand, a second input value or operand, and/or other input values generated during one or more previous epochs. The first input value and/or the second input value may have been generated by one or more other neural processing engines. The information related to a context for the first epoch may include a first connection weight, a second connection weight, and/or other connection weights. The first connection weight may indicate a weight to be applied to the first input value. The second connection weight may indicate a weight to be applied to the second input value. During operation 342, the first packet may be mapped into a fixed incoming packet space in the register file. The register file may be the same as or similar to register file 312 (shown in FIG. 3 and described herein). The first packet may be transferred to the register file by a dispatch unit the same as or similar to dispatch unit 210 (shown in FIG. 2 and described herein).

At an operation 344, instruction code associated with operations to be performed at the first epoch may be accessed. Such accessing may be performed responsive to reception of the first packet at operation 342. The particular instruction code accessed may correspond to an operation indicated by an operator code in the first packet. The instruction code may be stored in instruction storage the same as or similar to instruction storage 310 (shown in FIG. 3 and described herein).

At an operation 346, operations are performed by executing the instruction code accessed at operation 344 that implements the operations. Results and/or output values may be based on the first input value or operand and the second input value or operand. Determination of the result or output value may include applying the first connection weight to the first input value, applying the second connection weight to the second input value, and/or applying other connection weights. Determining the output value may include performing a look-up using a hardware look-up table as described elsewhere herein. Determining the output value may be accomplished in accordance with a relationship the same as or similar to the relationship expressed mathematically in equation 1 above. The output value may be used as an input value of the neuron-level process for a subsequent epoch. Execution of the instruction code may be performed by a logic unit the same as or similar to logic unit 314 (shown in FIG. 3 and described herein). The hardware look-up table may include one or more look-up tables the same as or similar to look-up tables 316 (shown in FIG. 3 and described herein).

At an operation 348, a second packet may be assembled. The second packet may be associated with a second epoch that is subsequent to the first epoch. The second packet may be assembled in an outgoing packet space within the register file. The outgoing packet space may be fixed within the register file. The second packet may include a header and a payload. The second packet may include one or more output values. The header may indicate one or more of a destination for the second packet, a type of information carried in the payload, a source of the information carried in the payload, a source of the packet, an indication of the first and/or second epoch(s), and/or other information. The payload may include information generated during the first epoch. For example, the payload may include the output value, and/or other information. As such, assembling the second packet may include writing the output value to the fixed outgoing packet space in the register file. In some implementations, the outgoing packet space may be the same as or similar to outgoing packet space 322 (shown in FIG. 3 and described herein).

At an operation 350, the second packet may be sent. Transfer of the second packet may be responsive to completion of the assembly of the second packet at operation 348. Transfer of the second packet may include transferring the second packet out of the register file by the dispatch unit, and/or other communications of the second packet from the register file to the dispatch unit. In some implementations, the outgoing packet space may be the same as or similar to outgoing packet space 322 (shown in FIG. 3 and described herein). In some implementations, the dispatch unit may be the same as or similar to dispatch unit 210 (shown in FIG. 2 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation and/or claim can be combined with one or more features of any other implementation and/or claim.

What is claimed is:

1. A neural processing engine comprising:
   non-transitive electronic storage configured to store instruction code implementing one or more operations;
   one or more register files configured to electronically and non-transitively store information such that individual ones of the one or more register files comprise:
      a first packet space into which input packets have been individually transferred by a dispatch unit that is external and independent from the neural processing engine, wherein individual input packets include one or more operands and one or more operator codes, and
      a second packet space from which output packets are to be individually transferred to the dispatch unit, the output packets including output values;
      a micro-sequencer configured to, responsive to an individual input packet having been transferred into the first packet space, determine one or more operations to be executed based on the one or more operator codes included in the individual input packet; and
      an arithmetic logic unit configured to perform the one or more determined operations on the one or more operands included in the individual input packet such that one or more output values are generated by executing the stored instruction code that implements the one or more determined operations,
   wherein the micro-sequencer is further configured to assemble the one or more output values generated by the arithmetic logic unit as an output packet in the second packet space,
   wherein the individual input packet includes an operator code of a special instruction that is implemented in a shared processing engine that is external from the neural processing engine, and wherein the micro-sequencer is further configured to transfer one or more special output values, generated by executing the special instruction, from the shared processing engine to assemble in the second packet space.

2. The neural processing engine of claim 1, wherein the input packets are provided by one or more other neural processing engines.

3. The neural processing engine of claim 1, wherein individual ones of the one or more register files are further configured to, responsive to assembly of the output packet, notify the dispatch unit that the output packet is available for transfer to the dispatch unit.

4. The neural processing engine of claim 1 comprising two register files that alternate between one of the two register files having an input packet being transferred into the first packet space and an other of the two register files executing the stored instruction code that implements the one or more determined operations that are based on the one or more operator codes included in the individual packet that has been transferred into the first packet space of the other of the two register files, and vice versa.

5. The neural processing engine of claim 1, wherein the first packet space and the second packet space alternate positions within an individual register file for subsequent individual input packets.

6. The neural processing engine of claim 1, further comprising a hardware look-up table that facilitates determination of an output value as a function of one or both of an operand included in the individual input packet and/or an intermediary variable used in executing the stored instruction code.

7. The neural processing engine of claim 1, wherein individual ones of the one or more register files include a dual-ported connection with the dispatch unit.

8. The neural processing engine of claim 1, wherein the hardware look-up table is configured to be set up by transferring information from individual ones of the one or more register files to the hardware look-up table.

9. The neural processing engine of claim 1, wherein the output values of an individual output packet include one or more destination addresses that identify one or more entities external and independent from the neural processing engine, and wherein the micro-sequencer is further configured to include one or more destination addresses during assembly of the output packet.

10. The neural processing engine of claim 1, wherein packets include a packet header and a data payload, and wherein the packet header indicates a neural processing engine as a destination for the packets.

11. The neural processing engine of claim 1 implemented with fewer than about 30,000 transistors in an integrated circuit.

12. A system for neural processing, the system comprising:
   non-transitive electronic packet storage configured to store packets, wherein individual packets include one or more destination addresses that identify one or more neural processing engines, one or more operands, and one or more operator codes;
   a first neural processing engine comprising:
      non-transitive electronic storage configured to store instruction code implementing one or more operations;
      a register file comprising a first packet space and a second packet space;
      a micro-sequencer configured to determine one or more operations to be executed based on the one or more operator codes included in an individual input packet in the first packet space; and
      an arithmetic logic unit configured to perform the one or more determined operations on the one or more operands included in the individual input packet such that one or more output values are generated by executing the stored instruction code that implements the one or more determined operations,
      wherein the micro-sequencer is further configured to assemble one or more output values as an output packet in the second packet space;
   a second neural processing engine comprising:
      non-transitive electronic storage configured to store instruction code implementing one or more operations;
      a register file comprising a first packet space and a second packet space;
      a micro-sequencer configured to determine one or more operations to be executed based on the one or more operator codes included in an individual input packet in the first packet space; and an arithmetic logic unit configured to perform the one or more determined operations on the one or more operands included in the individual input packet such that one or more output values are generated by executing the stored instruction code that implements the one or more determined operations, wherein the micro-sequencer is further configured to assemble one or more output values as an output packet in the second packet space; and a dispatch unit configured to individually transfer input packets from the non-transitive electronic packet storage to the first packet space of one or both of the first neural processing engine and/or the second neural processing engine, and further configured to individually transfer output packets from the second packet space of one or both of the first neural processing engine and/or the second neural processing engine, wherein the instruction code of the first neural processing engine is different from the instruction code of the second neural processing engine.

13. The system of claim 12, wherein the dispatch unit has point-to-point connections with the first neural processing engine and with the second neural processing engine.

14. The system of claim 12, wherein packets are accessed and transferred from the non-transitive electronic packet storage in a sequential manner.

15. The system of claim 12, wherein the register files of the first neural processing engine and the second neural processing engine include a dual-ported connection with the dispatch unit.

16. The system of claim 15, wherein the systems for neural processing has connections with four other systems for neural processing.

17. The system of claim 12, further comprising a non-transitive electronic data storage, wherein the dispatch unit is further configured to store one or both of individual packets and/or information contained in individual packets in the nontransitive electronic data storage, and wherein the dispatch unit is further configured to retrieve data from the non-transitive electronic data storage to be combined with an input packet from the non-transitive electronic packet storage during transfer.

18. A system for neural processing, the system comprising:
non-transitive electronic packet storage configured to store packets, wherein individual packets include one or more destination addresses that identify one or more neural processing engines, one or more operands, and one or more operator codes;
a first neural processing engine comprising:
non-transitive electronic storage configured to store instruction code implementing one or more operations;
a register file comprising a first packet space and a second packet space;
a micro-sequencer configured to determine one or more operations to be executed based on the one or more operator codes included in an individual input packet in the first packet space; and
an arithmetic logic unit configured to perform the one or more determined operations on the one or more operands included in the individual input packet such that one or more output values are generated by executing the stored instruction code that implements the one or more determined operations, wherein the micro-sequencer is further configured to assemble one or more output values as an output packet in the second packet space;

a second neural processing engine comprising:
non-transitive electronic storage configured to store instruction code implementing one or more operations;
a register file comprising a first packet space and a second packet space;
a micro-sequencer configured to determine one or more operations to be executed based on the one or more operator codes included in an individual input packet in the first packet space; and
an arithmetic logic unit configured to perform the one or more determined operations on the one or more operands included in the individual input packet such that one or more output values are generated by executing the stored instruction code that implements the one or more determined operations, wherein the micro-sequencer is further configured to assemble one or more output values as an output packet in the second packet space;

a dispatch unit configured to individually transfer input packets from the non-transitive electronic packet storage to the first packet space of one or both of the first neural processing engine and/or the second neural processing engine, and further configured to individually transfer output packets from the second packet space of one or both of the first neural processing engine and/or the second neural processing engine; and a shared processing engine accessible to the first neural processing engine and the second neural processing engine, wherein the shared processing engine implements one or more special instructions such that one or more special output values generated by executing the one or more special instructions are accessible within the system, the one or more special instructions not being implemented within the first neural processing engine or the second neural processing engine, wherein the individual input packet of the first neural processing engine includes an operator code of one of the one or more special instructions.

19. A method of performing neural processing, the method being implemented in a neural processing engine including a register file, non-transitive storage, the method comprising:
transferring a first packet into the register file, wherein the first packet includes one or more operands and one or more operator codes, wherein the first packet further includes an operator code of a special instruction that is implemented in a shared processing engine that is external from the neural processing engine;
determining one or more operations to be executed based on the one or more operator codes included in the first packet;
performing the one or more determined operations on the one or more operands included in the first packet such that one or more output values are generated by executing instruction code stored in the non-transitive storage, wherein the executed instruction code implements the one or more determined operations;
transferring one or more special output values, generated through execution of the special instruction by the shared processing engine, from the shared processing engine; and
assembling the one or more generated output values and the one or more special output values as an output packet in the register file.

20. The method of claim 19, wherein the first packet is transferred into the register file by a dispatch unit, further comprising:

transferring the output packet from the register file to the dispatch unit.

21. The method of claim 19, wherein the first packet is provided by a second neural processing engine.

22. The method of claim 20, wherein the output values of the output packet include one or more destination addresses that identify one or more entities external and independent from the neural processing engine, the method further comprising:

transferring the output packet by the dispatch unit to the one or more destination addresses included in the output packet.

23. A method of performing neural processing, the method being implemented in a system for neural processing including packet storage, a first neural processing engine, a second neural processing engine, and a dispatch unit, the method comprising:

transferring a first packet from the packet storage by the dispatch unit into a register file of the first neural processing engine, wherein the first packet includes one or more operands and one or more operator codes;

determining one or more operations to be executed by the first neural processing engine based on the one or more operator codes included in the first packet;

performing the one or more determined operations by the first neural processing engine on the one or more operands included in the first packet by executing instruction code stored in the first neural processing engine such that one or more output values are generated;

assembling the one or more generated output values as an output packet in the register file of the first neural processing engine;

transferring the output packet from the register file in the first neural processing engine to the dispatch unit;

transferring the output packet from the dispatch unit into a register file of the second neural processing engine;

determining one or more operations to be executed by the second neural processing engine based on the one or more operator codes included in the output packet;

performing the one or more determined operations by the second neural processing engine on the one or more operands included in the output packet la executing instruction code stored in the second neural processing engine such that one or more output values are generated;

assembling the one or more generated output values as an third packet in the register file of the second neural processing engine; and transferring the third packet from the register file in the second neural processing engine to the dispatch unit, wherein the instruction code stored in the first neural processing engine is different from the instruction code in the second neural processing engine.

* * * * *